United States Patent
Arai

(10) Patent No.: US 11,694,366 B2
(45) Date of Patent: Jul. 4, 2023

(54) IMAGE PROCESSING APPARATUS, IMAGE PROCESSING METHOD, AND STORAGE MEDIUM USING IMAGE PROCESSING TECHNIQUE FOR EVALUATING COLORS OF A CAPTURED OBJECT

(71) Applicant: CANON KABUSHIKI KAISHA, Tokyo (JP)

(72) Inventor: Kimitaka Arai, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 97 days.

(21) Appl. No.: 17/339,743

(22) Filed: Jun. 4, 2021

(65) Prior Publication Data
US 2021/0390740 A1    Dec. 16, 2021

(30) Foreign Application Priority Data
Jun. 11, 2020  (JP) ................................ 2020-101701

(51) Int. Cl.
*G06T 7/90*   (2017.01)
*G06T 11/20*  (2006.01)
*G06T 7/11*   (2017.01)

(52) U.S. Cl.
CPC ............. *G06T 7/90* (2017.01); *G06T 7/11* (2017.01); *G06T 11/206* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 5,546,475 A | * | 8/1996 | Bolle | G06V 10/507 382/110 |
| 7,477,286 B2 | * | 1/2009 | Engholm | H04N 17/02 348/649 |
| 2007/0165945 A1 | * | 7/2007 | Goma | H04N 1/6086 382/167 |
| 2014/0168463 A1 | * | 6/2014 | Tamura | H04N 9/735 348/223.1 |
| 2019/0335150 A1 | * | 10/2019 | Shin | H04N 9/735 |
| 2021/0004995 A1 | * | 1/2021 | Burg | G01J 3/463 |

FOREIGN PATENT DOCUMENTS

JP       2011-035894 A      2/2011

* cited by examiner

*Primary Examiner* — Edward Martello
(74) *Attorney, Agent, or Firm* — Canon U.S.A., Inc. IP Division

(57) ABSTRACT

A first obtaining unit obtains two images obtained by capturing images of an inspection target object under different capturing environments with different illumination conditions inputted by a user. A second obtaining unit obtains area information that specifies two types of areas set by the user regarding an area in each image. The two types of areas include a reference area serving as a reference for comparison between the areas and a comparison target area serving as a target of comparison. A converting unit generates color conversion parameters for carrying out color conversion such that a color value of the reference area in one image coincides with a color value of the reference area in the other image. A deriving unit derives a color difference between the reference area and the comparison target area regarding each of the two images.

17 Claims, 14 Drawing Sheets

|  | REFERENCE AREA OF IMAGE 1 | | | REFERENCE AREA OF IMAGE 2 | | |
| --- | --- | --- | --- | --- | --- | --- |
|  | STARTING POINT | ENDING POINT | RGB AREA AVERAGE | STARTING POINT | ENDING POINT | RGB AREA AVERAGE |
| AREA INFORMATION 1 | X_110、Y_110 | X_111、Y_111 | $RGB^{ave}\_11$ | X_211、Y_211 | X_211、Y_211 | $RGB^{ave}\_21$ |
| AREA INFORMATION 2 | X_120、Y_120 | X_121、Y_121 | $RGB^{ave}\_12$ | X_221、Y_221 | X_221、Y_221 | $RGB^{ave}\_22$ |
| ... | ... | ... | ... | ... | ... | ... |
| AREA INFORMATION N | X_1N0、Y_1N0 | X_1N1、Y_1N1 | $RGB^{ave}\_1N$ | X_2N1、Y_2N1 | X_2N1、Y_2N1 | $RGB^{ave}\_0N$ |

FIG.5

|  | RGB 1_1 | RGB 1_2 | ... | RGB 1_n |
|---|---|---|---|---|
| RGB 1_1 | | | | |
| RGB 1_2 | 0 | | | |
| ⋮ | ⋮ | ⋮ | | |
| RGB 1_n | 1 | 0 | 0 | |

FIG.11

IMAGE PROCESSING APPARATUS, IMAGE PROCESSING METHOD, AND STORAGE MEDIUM USING IMAGE PROCESSING TECHNIQUE FOR EVALUATING COLORS OF A CAPTURED OBJECT

BACKGROUND OF THE DISCLOSURE

Field of the Disclosure

The technique in this disclosure relates to an image processing technique for evaluating colors of a captured object.

Description of the Related Art

One may wish to compare images while eliminating effects of illumination in order to compare colors between images captured under image capturing environments with different illumination conditions. An example of a technique for eliminating the aforementioned effects of illumination is disclosed in Japanese Patent Laid-Open No. 2011-035894. Japanese Patent Laid-Open No. 2011-035894 discloses a technique configured to change white balance of a processing target image by using white balance of a reference image obtained by capturing an image under an image capturing environment with an illumination condition serving as a reference, and match the white balance of the processing target image with the white balance of the reference image. In this method, a gain for each pixel channel for illumination component conversion is calculated from RGB values of the reference image and the processing target image and from a white balance gain for each pixel channel in the reference image. Then, the white balance of the processing target image is matched to the white balance of the reference image by applying the gains of the respective pixel channels to the processing target image.

However, the technique according to Japanese Patent Laid-Open No. 2011-035894 can match the white balance between these images but cannot match balance of channel gains of other colors inclusive of colors near gray. Accordingly, for example, in the case where colors other than white are compared with each other between images captured under image capturing environments with different illumination conditions, this technique has an issue of a difficulty in accurately comparing the colors because of imbalance of channel gains of these colors between the images.

SUMMARY OF THE DISCLOSURE

A technique of this disclosure provides an apparatus including: a first obtaining unit configured to obtain a first image and a second image obtained by capturing images of a target object under different capturing conditions; a second obtaining unit configured to obtain area information on the first image and the second image, the area information being set in an area corresponding to the object and specifying a reference area serving as a reference for comparison and a comparison target area serving as a target for the comparison; a generating unit configured to generate a color conversion parameter for color conversion of a color value of the reference area in the second image based on a color value of the reference area in the first image; and a deriving unit configured to derive a color difference between the reference area and the comparison target area in the second image based on the color conversion parameter.

Further features of the disclosure will become apparent from the following description of exemplary embodiments with reference to the attached drawings.

BRIEF DESCRIPTION OF THE DRAWINGS

FIG. 5 is a diagram showing an example of area information.

FIG. 11 is a diagram showing an example of degree of identicalness data

DESCRIPTION OF THE EMBODIMENTS

Embodiments of this disclosure will be described below with reference to the drawings. It is to be understood that the following embodiments are not necessarily intended to limit the scope of the technique of this disclosure. It is to be also noted that a combination of all the features described in any of the following embodiments is not always essential for a solution of the technique of this disclosure.

First Embodiment

<Hardware Configuration of Image Processing Apparatus>

Figure 1:
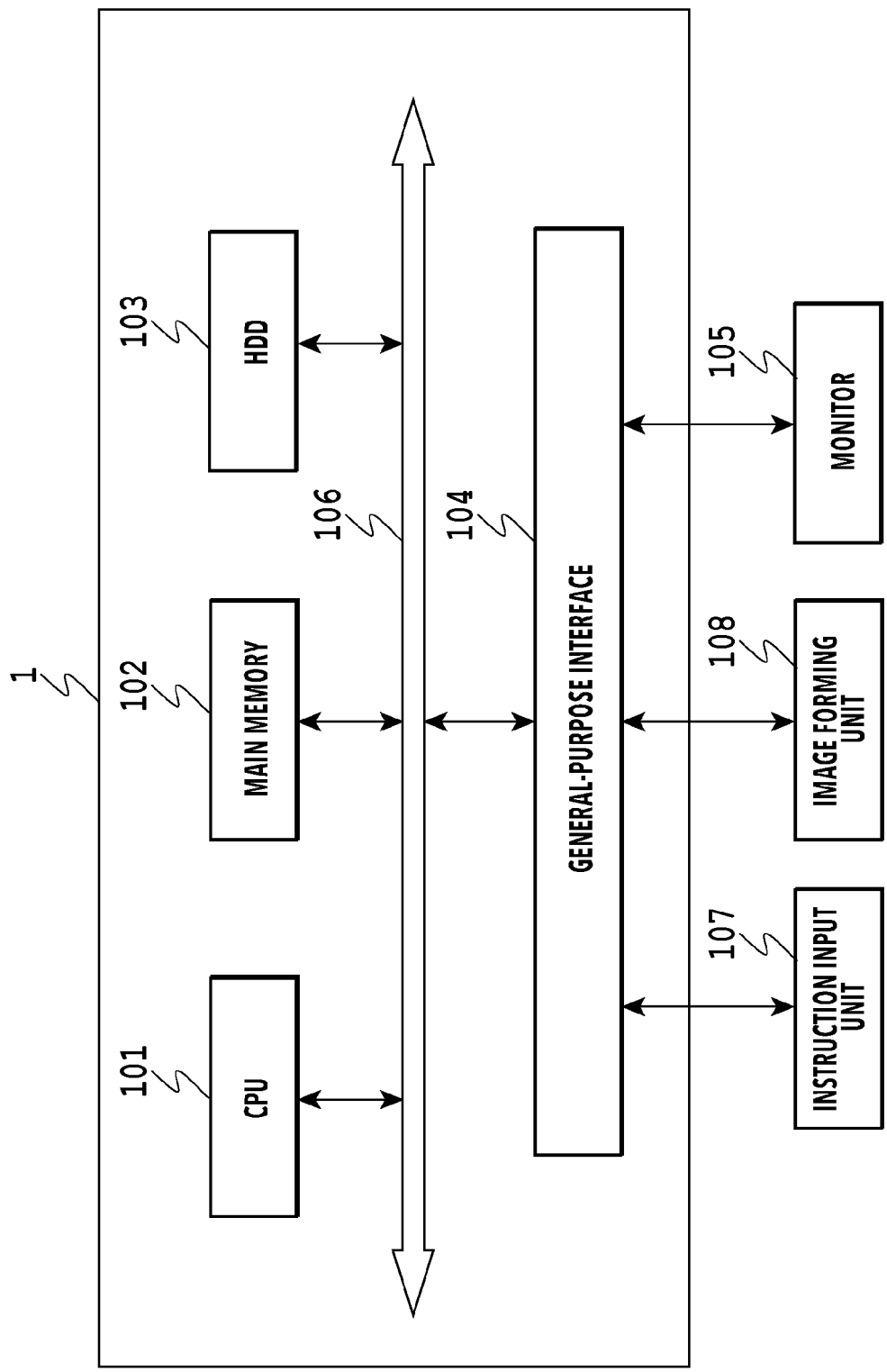
FIG. 1 is a block diagram showing a hardware configuration of an image processing apparatus.

FIG. 1 shows a configuration example of an image processing apparatus 1 of this embodiment. In FIG. 1, a CPU 101 executes an operating system (OS) and various programs stored in a storage device such as a hard disk drive (HDD) 103 or in various storage media while using a main memory 102 as a work memory. Then, the CPU 101 executes the programs, thereby controlling respective structures through a system bus 106. Here, programs for executing processing flows to be described later are included in the programs to be executed by the CPU 101. A general-purpose interface (I/F) 104 is a serial bus interface such as USB, to which an instruction input unit 107 such as a mouse or a keyboard, an image forming unit 108, and the like are connected through serial buses. The CPU 101 uses the various storage media mounted on the HDD 103 as data storage spaces for reading and writing. The CPU 101 displays a user interface (UI) provided by a program on a monitor 105, and performs display control to receive user input including a user instruction through the instruction input unit 107.

A description will be given of processing to be executed by an image processing application based on an instruction from the CPU 101 in the above-described configuration.

<Logic Configuration of Image Processing Apparatus>

Figure 2:
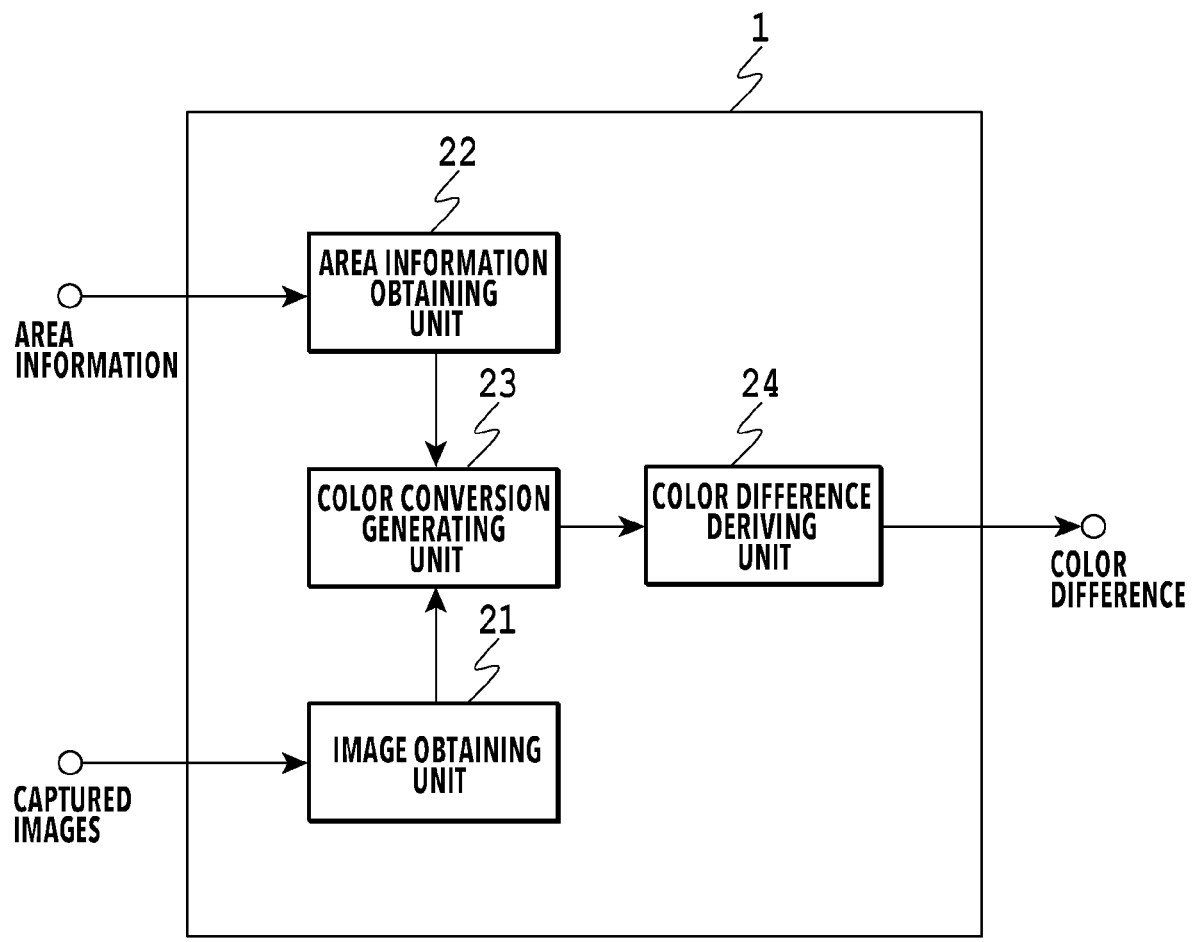
FIG. 2 is a block diagram showing a logic configuration of the image processing apparatus.

FIG. 2 is a block diagram showing a logic configuration of the image processing apparatus 1 of this embodiment. The image processing apparatus 1 includes an image obtaining unit 21, an area information obtaining unit 22, a color conversion generating unit 23, and a color difference deriving unit 24.

The image obtaining unit 21 obtains two captured images obtained by capturing images of an inspection target object under image capturing environments with different illumination conditions inputted by a user.

The area information obtaining unit 22 obtains area information that specifies two types of areas set by the user in an image area corresponding to the object in each captured image. Here, the two types of areas include an area (hereinafter referred to as a "reference area") serving as a reference for comparing the areas with each other, and an area (hereinafter referred to as a "comparison target area") serving as a comparison target.

The color conversion generating unit 23 generates color conversion parameters used for carrying out color conversion such that a color value of a reference area set in one of the captured images matches a color value of a reference area set in the other captured image based on the above-mentioned area information and on the two captured images.

The color difference deriving unit 24 derives a color difference between the reference area and the comparison target area regarding each of the two captured images.

<Processing to be Executed by Image Processing Apparatus>

Figure 3:
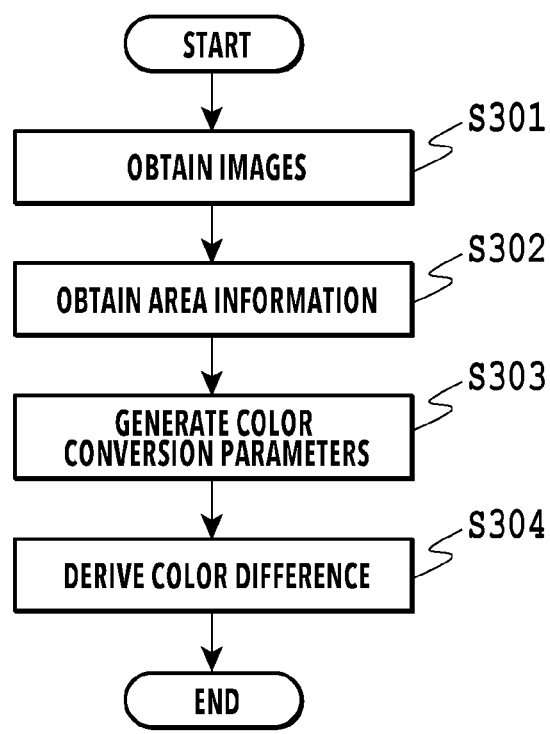
FIG. 3 is a flowchart showing processing to be executed by the image processing apparatus.

FIG. 3 is a flowchart of processing to be executed by the image processing apparatus 1. Details of an operation by the image processing apparatus 1 will be described below with reference to FIG. 3. Note that this operation is started on a condition that the user inputs a prescribed instruction by manipulating the instruction input unit 107. In the following, each step (procedure) will be expressed by a number prefixed with S.

In S301, the image obtaining unit 21 obtains the two captured images that are obtained by capturing the images of the inspection target object.

In S302, the area information obtaining unit 22 obtains one or more pieces of area pair information by using the UI to be described later.

In S303, the color conversion generating unit 23 generates the color conversion parameters in accordance with a method to be described later.

In S304, the color difference deriving unit 24 derives the color difference in accordance with a method to be described later.

<UI in S302>

Figure 4:
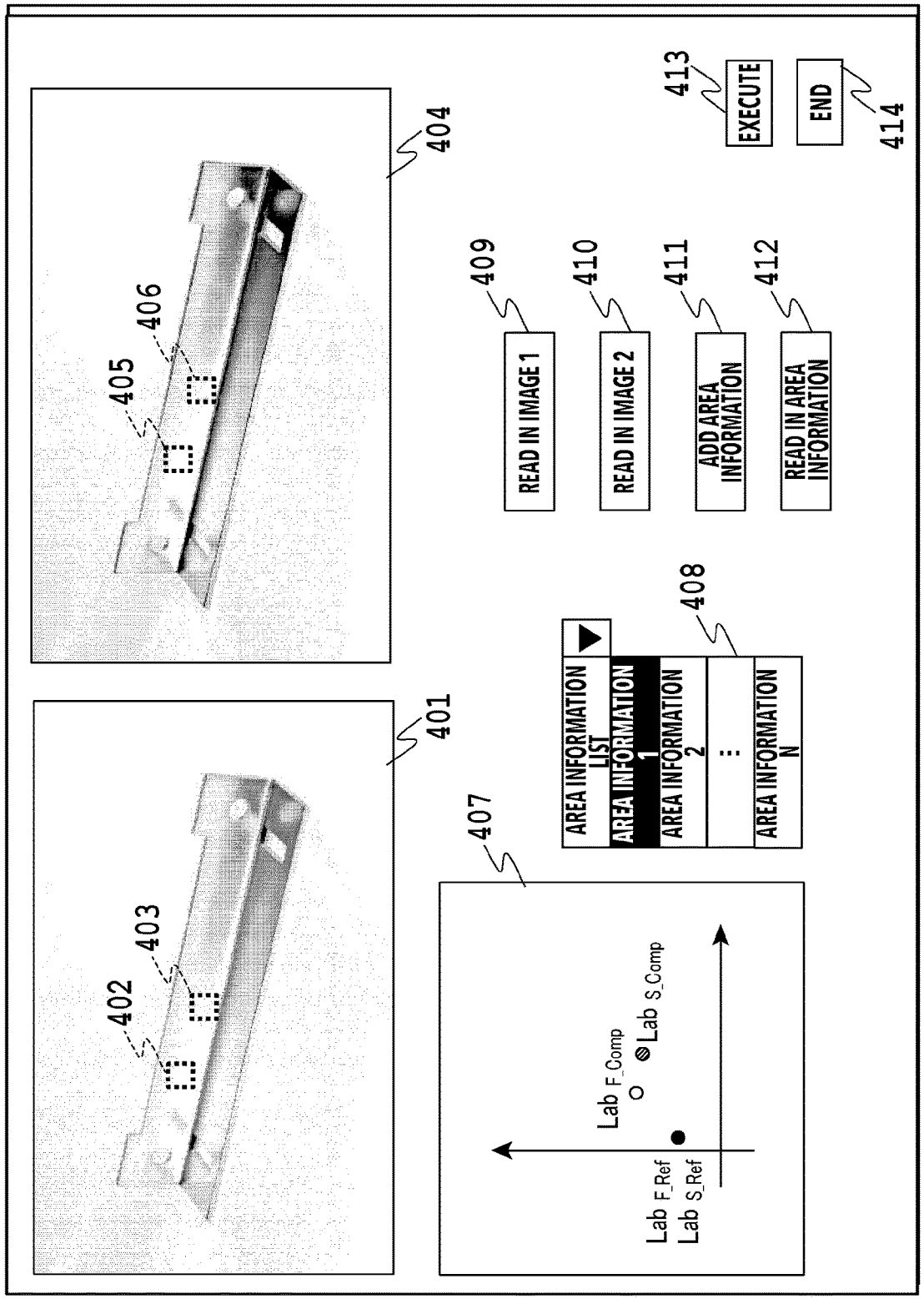
FIG. 4 is a diagram showing an example of a user interface.

FIG. 4 is a schematic diagram showing a UI screen displayed in S302. Now, a description will be given below with reference to FIG. 4.

An image display window 401 is a window that displays an image 1, which is one of the inputted captured images. The user can designate a reference area 402 and a comparison target area 403 on the image display window 401. An image display window 404 is a window that displays an image 2, which is another one of the inputted captured images. The image display window 404 is displayed in such a way as to be comparable with the image display window 401. The user can designate a reference area 405 and a comparison target area 406 on the image display window 404. Here, in one embodiment, the reference area 402 in the image 1 and the reference area 405 in image 2 are selected in such a way as to include image areas that capture the same region of a subject. Likewise, the comparison target area 403 in the image 1 and the comparison target area 406 in image 2 are selected in such a way as to include image areas that capture the same region of the subject. Note that the pieces of the area information on the reference areas 402 and 405 and on the comparison target areas 403 and 406 may be defined as coordinates to specify positions of the areas in the image, for example.

A color difference display graph 407 is obtained by plotting color information on the reference area 402, the comparison target area 403, the reference area 405, and the comparison target area 406 as color space coordinates and displaying the color information on a graph.

An area information list 408 displays a list of the area pair information of the area information on the reference areas 402 designated in the image display window 401 and the reference areas 405 designated in the image display window 404. Here, FIG. 5 shows an example of the area pair information included in the area information list. Each piece of the area pair information holds information concerning the reference areas 402 and 405 in the image 1 and the image 2, and RGB area average values $RGB^{ave}$ in these reference areas. In FIG. 5, coordinate values at an upper left corner and a lower right corner of a rectangle that defines each of the reference areas 402 and 405 are used as an example of each piece of the area information. Each RGB area average value $RGB^{ave}$ is recorded at the point of derivation in processing (S902) to be described later.

An image 1 read-in button 409 is a button used for reading in the image 1. An image 2 read-in button 410 is a button used for reading in the image 2. An area information add button 411 is a button used for adding the area pair information concerning a new pair of the reference areas in the image 1 and the image 2. An area information read-in button 412 is a button used for reading in a file or the like that records the area information concerning the pair of the reference areas in the image 1 and the image 2 prepared in advance. An execute button 413 is an execute button for carrying out color difference information calculation. An end button 414 is a button for terminating the series of processing shown in FIG. 3.

Figure 6:
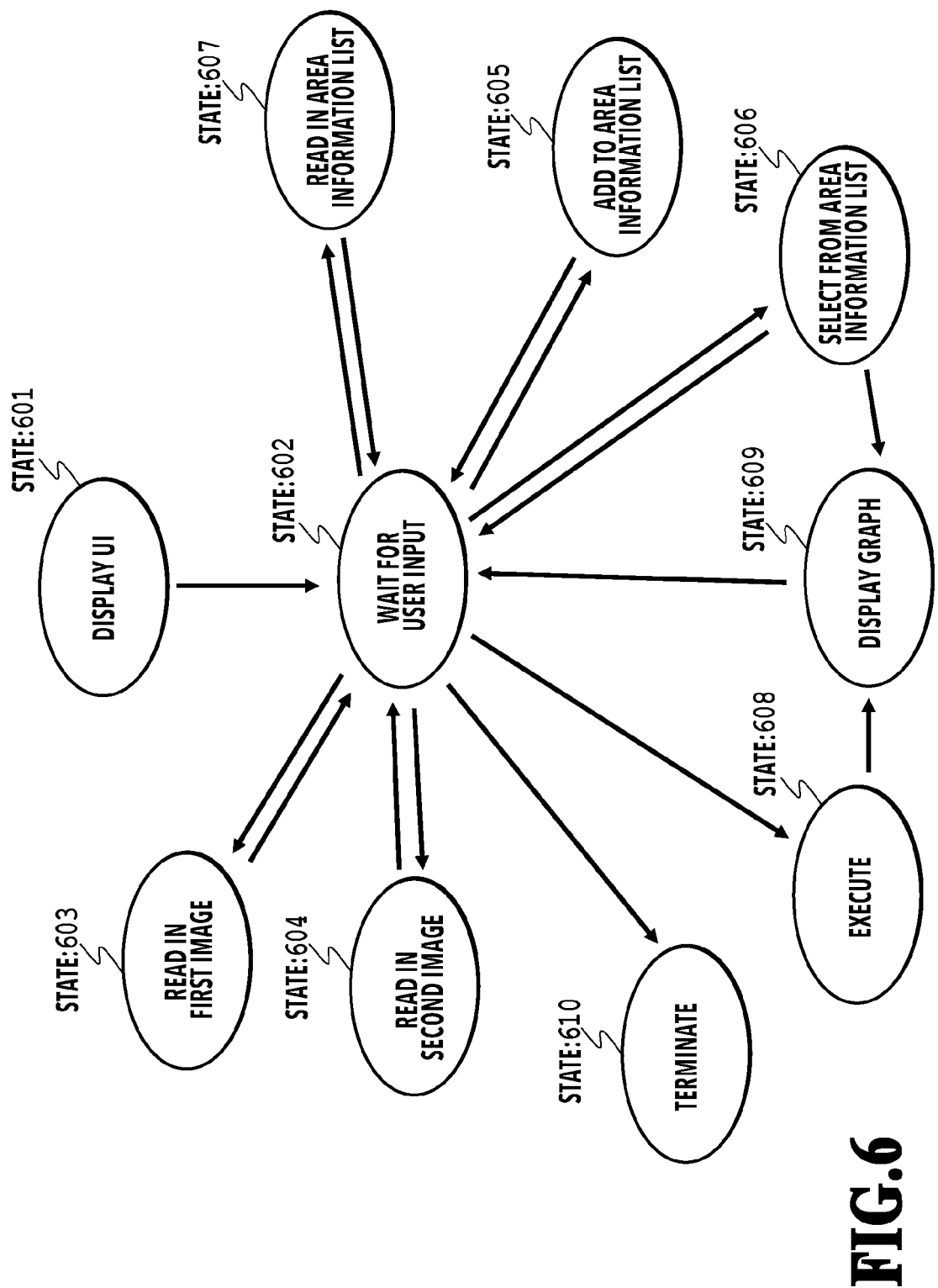
FIG. 6 is a diagram showing a state transition of a UI.

FIG. 6 is a diagram showing a state transition of the user interface. A description will be given below with reference to FIG. 6.

In state 601, upon detection of an application start instruction by a user operation through the instruction input unit 107, the image processing apparatus 1 displays the UI as shown in FIG. 4. Then, the state transitions to state 602.

The state transitions to state 603 in a case where the area information obtaining unit 22 detects press of the image 1 read-in button 409 by a user operation through the instruction input unit 107 in state 602. Then, the area information obtaining unit 22 reads in the captured image designated by the user operation and displays the read captured image on the image display window 401. Then, the state transitions to state 602.

The state transitions to state 604 in a case where the area information obtaining unit 22 detects press of the image 2 read-in button 410 by a user operation in state 602. Then, the area information obtaining unit 22 reads in the captured image designated by the user operation and displays the read captured image on the image display window 404. Then, the state transitions to state 602.

The state transitions to state 605 in a case where the area information obtaining unit 22 detects press of the area information add button 411 by a user operation in state 602. Then, the area information obtaining unit 22 adds the area pair information on the reference area 402 designated in the window 401 and the reference area 405 designated in the window 404 to the area information list. Then, the state transitions to state 602.

The state transitions to state 607 in a case where the area information obtaining unit 22 detects press of the area information read-in button 412 by a user operation in state 602. Then, the area information obtaining unit 22 reads in the area pair information held in a file designated by the user operation and displays the read area pair information on the list. Then, the state transitions to state 602.

The state transitions to state 606 in a case where the area information obtaining unit 22 detects selection of a piece of the area pair information from the area information list 408 by a user operation in state 602. Then, in state 606, the state transitions to state 609 in a case where the color difference deriving unit 24 has already executed the color difference derivation or transitions to state 602 in a case where the color difference deriving unit 24 has not executed the color difference derivation yet.

The state transitions to state 608 in a case where the area information obtaining unit 22 detects press of the execute button 413 by a user operation in state 602. Then, in state 608, the color difference deriving unit 24 carries out the color difference derivation in accordance with the user input. Then, the state transitions to state 609.

In state 609, the color difference deriving unit 24 displays a result of the color difference derivation on the monitor 105 as the color difference display graph 407. Then, the state transitions to state 602.

The state transitions to state 610 in a case where the image processing apparatus 1 detects press of the end button 414 by a user operation in state 602. The image processing apparatus 1 carries out processing associated with termination of the application.

<Color Conversion Parameter Generation Processing in S303>

Figure 7:
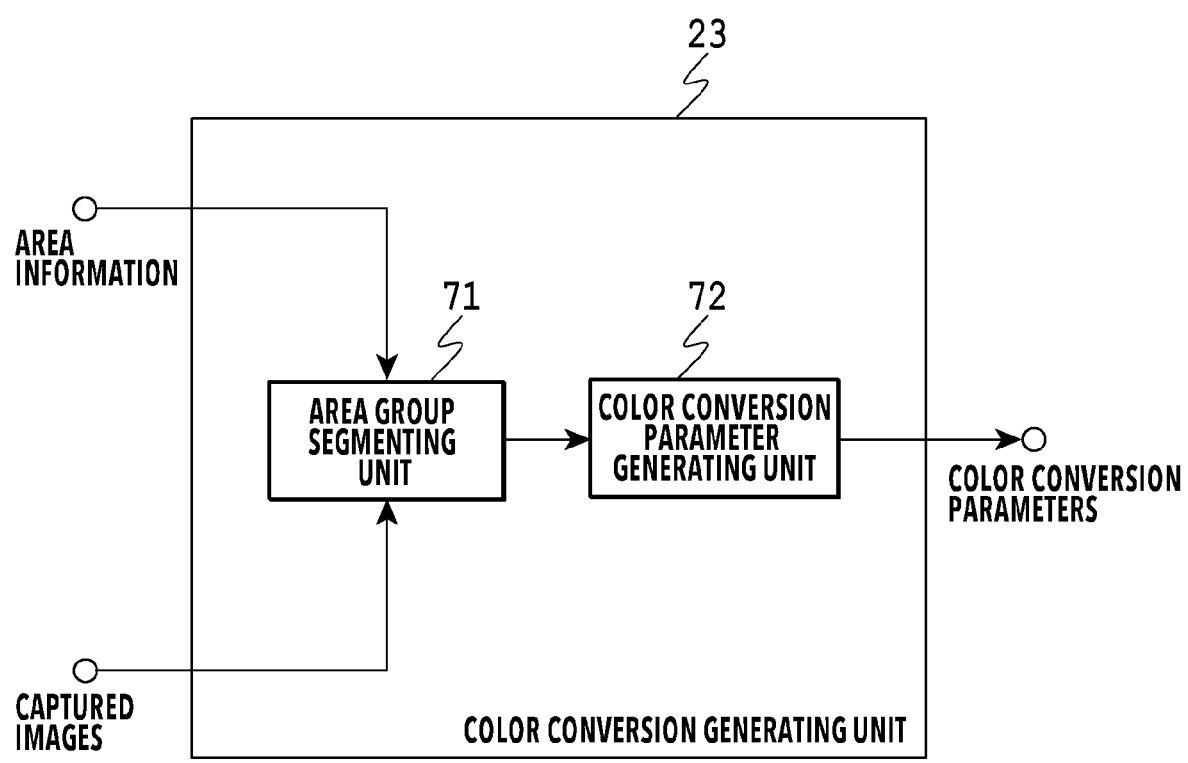
FIG. 7 is a diagram showing a logic configuration of a color conversion generating unit.

FIG. 7 is a block diagram showing details of the color conversion generating unit 23 that executes S303. The color conversion generating unit 23 includes an area group segmenting unit 71 and a color conversion parameter generating unit 72. The area group segmenting unit 71 classifies area information data into appropriate area groups in the course of generating the color conversion parameters. The color conversion parameter generating unit 72 generates the color conversion parameters based on pixel values of the classified reference areas.

Figure 8:
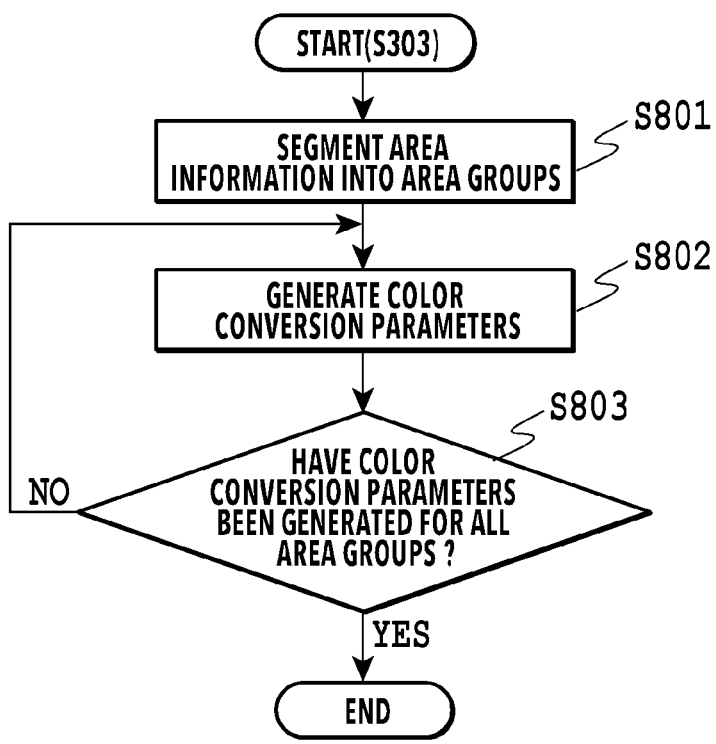
FIG. 8 is a flowchart showing color conversion generation processing.

FIG. 8 is a flowchart for explaining an operation of color conversion generation processing to be executed in S303. Now, a description will be given below of details of the operation of the image processing apparatus 1 with reference to FIG. 8.

In S801, the area group segmenting unit 71 segments the area information into the area groups based on the degree of identicalness between the reference areas set to the image 1 and the degree of identicalness between the reference areas set to the image 2 to be derived in the processing to be described later.

<Operation of Area Group Segmentation Processing in S801>

Figure 9:
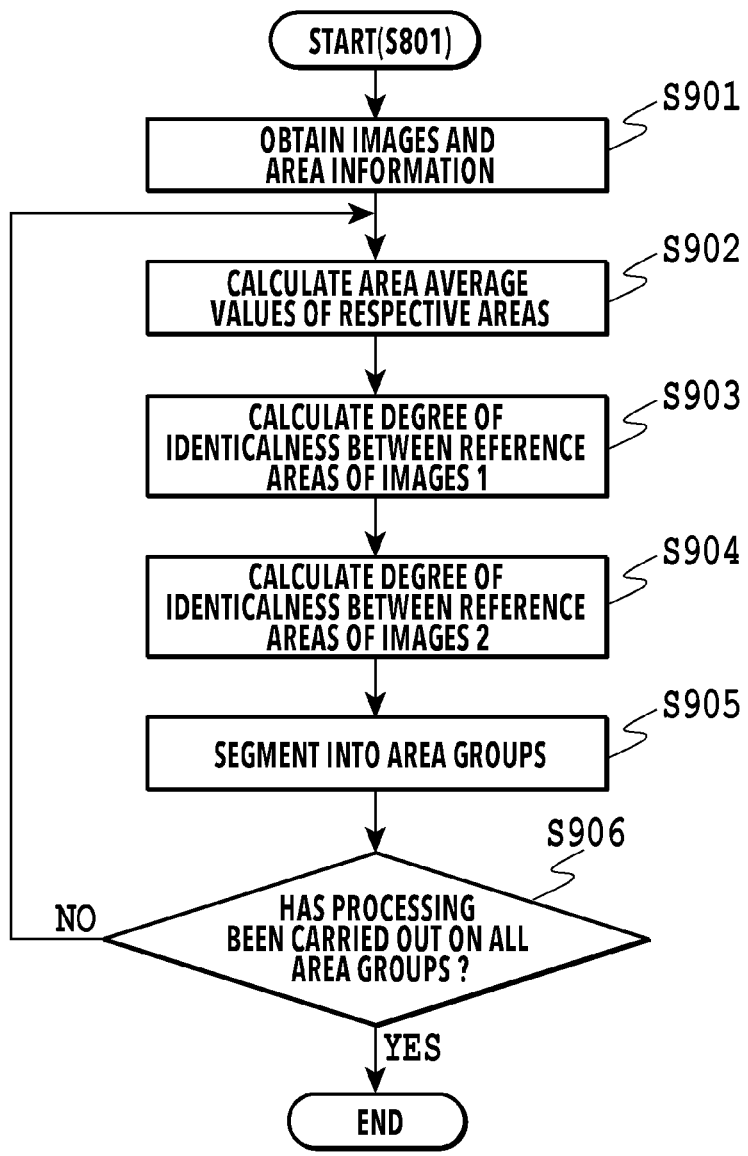
FIG. 9 is a flowchart showing area group segmentation processing.

FIG. 9 is a flowchart for describing an operation of area group segmentation processing to be executed in S801. Now, a description will be given below of details of the operation of the area group segmentation processing with reference to FIG. 9.

In S901, the area group segmenting unit 71 obtains the image 1 and the image 2 as well as one or more pieces of the area pair information on the reference areas set to the image 1 and the image 2.

In S902, the area group segmenting unit 71 calculates RGB area average values $RGB^{ave}$ of the reference areas and the comparison target areas in the respective captured images designated in the respective pieces of the area pair information in accordance with formula 2. The RGB area average value $RGB^{ave}$ is a value obtained by dividing sums components of each channel of RGB values regarding all the pixels in each area by the number of pixels, respectively, and is expressed by $RGB^{ave}=(R^{ave}, G^{ave}, B^{ave})$.

$$\left.\begin{array}{l} R^{ave} = \dfrac{\sum R_k}{(x_{110} - x_{111})(y_{110} - y_{111})} \\[6pt] G^{ave} = \dfrac{\sum G_k}{(x_{110} - x_{111})(y_{110} - y_{111})} \\[6pt] B^{ave} = \dfrac{\sum B_k}{(x_{110} - x_{111})(y_{110} - y_{111})} \end{array}\right\}$$

In S902, the color conversion parameter generating unit 72 calculates the degree of identicalness between the reference areas set in the image 1 to be specified by a difference piece of the area pair information on the area information list, in accordance with processing to be described later.

In S904, the color conversion parameter generating unit 72 calculates the degree of identicalness between the reference areas set in the image 2 to be specified by the difference piece of the area pair information on the area information list, in accordance with the processing to be described later.

In S905, the color conversion parameter generating unit 72 subjects the pieces of the area pair information included in the area information list to segmentation into the area groups based on the degree of identicalness in accordance with processing to be described later. Here, the respective area groups are formed such that the degree of identicalness between the reference areas of the image specified by each piece of the area pair information included in the same area group becomes equal to or below a prescribed threshold, and such that the number of pieces of the area pair information included in each area group becomes equal to or below a prescribed number.

In S906, the area group segmenting unit 71 determines whether or not the processing from S902 to S905 has been carried out on all the pieces of the area pair information. The processing proceeds to S902 if the processing from S902 to S905 has not been carried out on all the pieces of the area pair information yet. The area group segmentation processing is terminated if the processing from S902 to S905 has been carried out on all the pieces of the area pair information.

<Operation of Degree of Identicalness Derivation Processing in S903 and 904>

Figure 10:
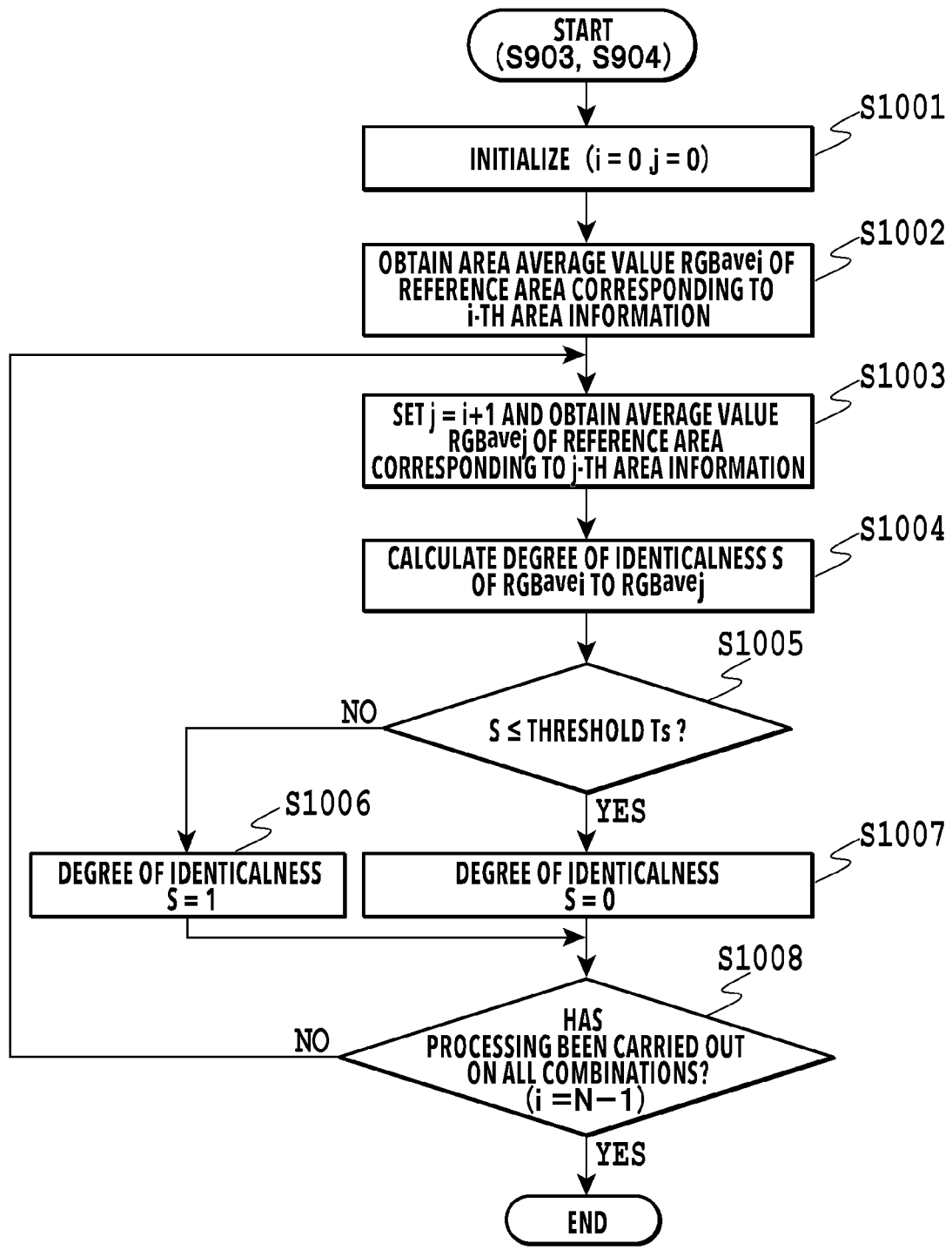
FIG. 10 is a flowchart showing degree of identicalness derivation processing.

FIG. 10 is a flowchart for explaining an operation of degree of identicalness derivation processing to be executed in S903 and 904. Details of the degree of identicalness derivation processing will be described below with reference to FIG. 10.

In S1001, the area group segmenting unit 71 defines variables i and j (i<j) for identifying the reference areas specified by the area pair information in the area information list and initializes the value i (i=0) as an initializing operation. Meanwhile, a total number of the pieces of the area pair information included in the area information list is defined as N.

In S1002, the area group segmenting unit 71 obtains the RGB area average value of the reference area specified by an i-th piece of the area pair information (hereinafter referred to as an "i-th reference area") in the area information list of images.

In S1003, the area group segmenting unit 71 sets j=i+1 and defines a reference area specified by another piece of the area pair information on the area information list for calculating the degree of identicalness to the i-th reference area as a j-th reference area, and obtains the RGB area average value $RGB^{ave}$ thereof.

In S1004, the area group segmenting unit 71 calculates the degree of identicalness in accordance with formula 3. Here, distances in an RGB color space are used as an example of the degree of identicalness. Note that the RGB area average value of the i-th reference area is expressed by $RGB^{ave}_i = (R^{ave}_i, G^{ave}_i, B^{ave}_i)$, the RGB area average value of the j-th reference area is expressed by $RGB^{ave}_j = (R^{ave}_j, G^{ave}_j, B^{ave}_j)$, and the degree of identicalness is expressed by S(i, j).

$$S(i, j) = \sqrt{(R^{ave}_i - R^{ave}_j)^2 + (G^{ave}_i - G^{ave}_j)^2 + (B^{ave}_i - B^{ave}_j)^2} \quad \text{Formula (3)}$$

In S1005, the area group segmenting unit 71 compares the degree of identicalness S(i, j) with a threshold Ts. The processing proceeds to S1006 if the degree of identicalness S(i, j) is equal to or below the threshold Ts. The processing proceeds to S1007 if the degree of identicalness S (i, j) is above the threshold Ts. Here, the minimum value of the threshold Ts is 0. However, the minimum value is not limited only to the foregoing.

In S1006, the area group segmenting unit 71 determines the degree of identicalness S(i, j)=0, and the processing proceeds to S1008.

Figure 11:
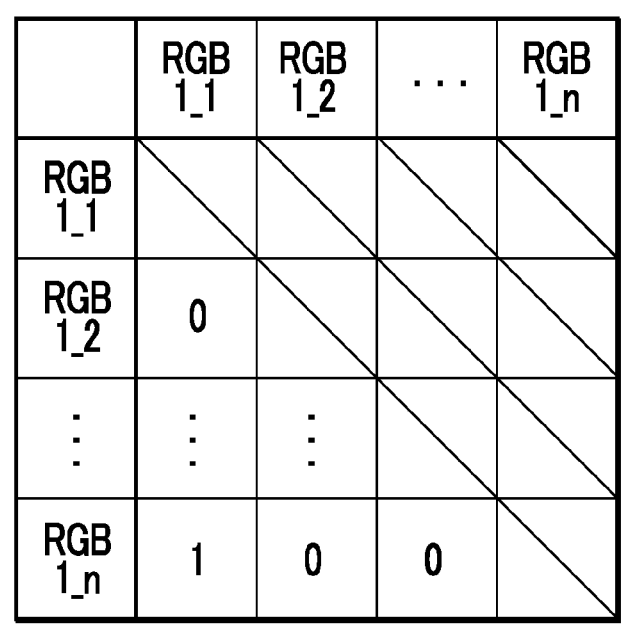

In S1007, the area group segmenting unit 71 determines the degree of identicalness S(i, j)=1, and the processing proceeds to S1008. Here, the degree of identicalness S(i, j) is schematically shown in FIG. 11.

In S1008, the area group segmenting unit 71 determines whether or not i<N is satisfied. If i<N is satisfied, the area group segmenting unit 71 adds 1 to the value i and the processing returns to S1002. If i<N is not satisfied, the degree of identicalness derivation processing is terminated.

<Operation of Area Segmentation Processing in S905>

Figure 12:
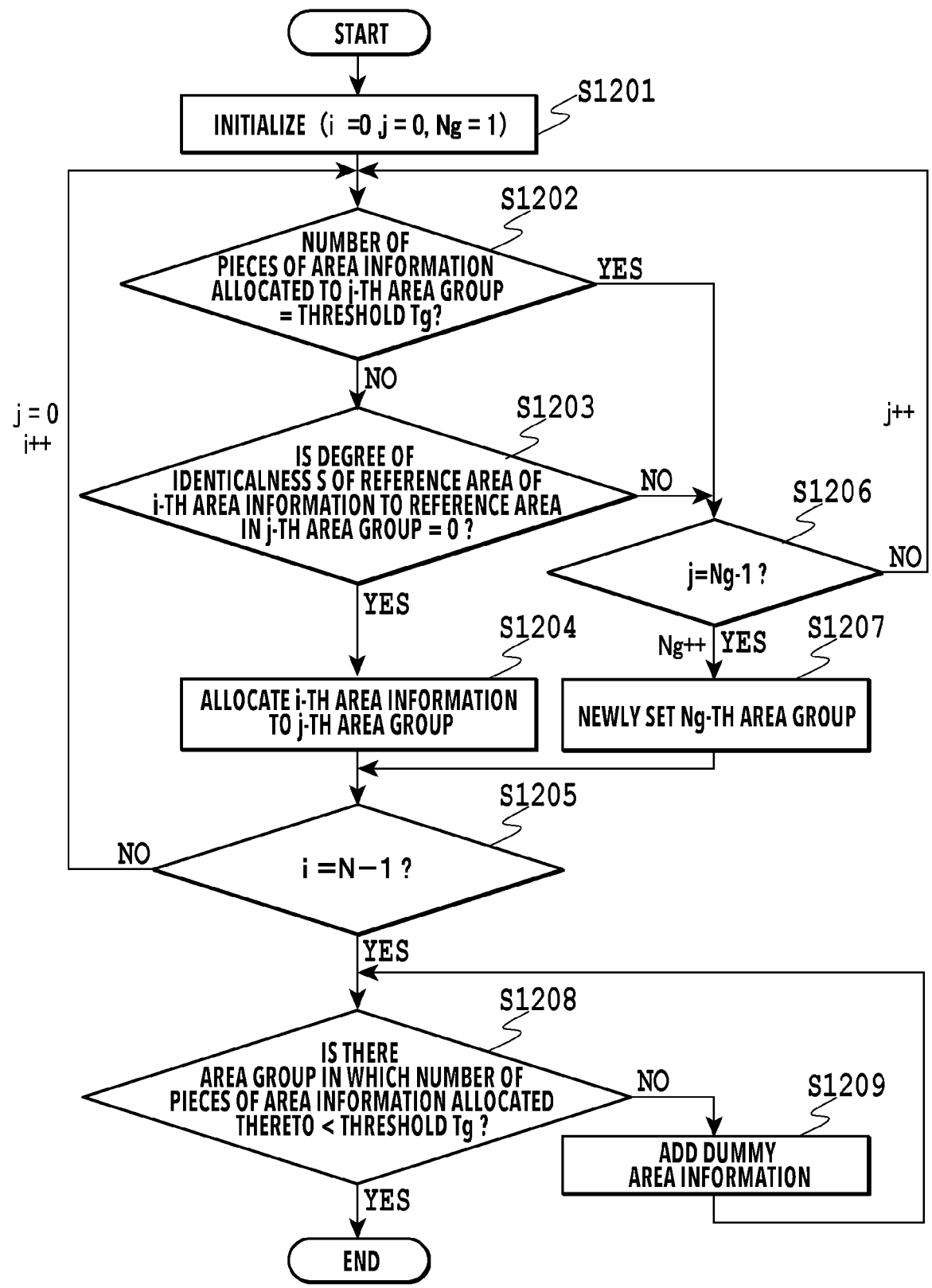
FIG. 12 is a flowchart showing area segmentation processing

FIG. 12 is a flowchart of the processing to be executed in S905. Details of an operation in area segmentation processing will be described below with reference to FIG. 12.

In S1201, the area group segmenting unit 71 initializes the variable i for identifying the reference area specified by the area pair information in the area information list, the variable j for identifying the area group therein, and a variable Ng representing a total number of the area groups as i=0, j=0, and Ng=1, respectively.

In S1202, the area group segmenting unit 71 determines whether or not the number of pieces of the area pair information allocated to the area group j falls below a threshold Tg. The processing proceeds to S1203 if this number does not exceed the threshold Tg, or otherwise, proceeds to S1206. In this embodiment, the threshold Tg is set to 3.

In S1203, the area group segmenting unit 71 determines whether or not the degree of identicalness S between the reference area of the image 1 specified by an i-th piece of the area pair information and the reference area of the image 1 specified by the area pair information included in a j-th area group is 0 or 1. In addition, the area group segmenting unit 71 determines whether or not the degree of identicalness S between the reference area of the image 2 specified by the i-th piece of the area pair information and the reference area of the image 2 specified by the area pair information included in the j-th area group is 0 or 1. In consequence, the processing proceeds to S1204 if both of the degrees of identicalness S satisfy S=0, or otherwise, proceeds to S1206.

In S1204, the area group segmenting unit 71 allocates the i-th piece of the area pair information to the j-th area group.

In S1205, the area group segmenting unit 71 determines whether or not the area segmentation processing has been carried out on all the pieces of the area pair information included in the area information list (i=N−1). The processing proceeds to S1202 if the area segmentation processing has not been carried out for all the pieces of the area pair information. Otherwise, the value j is initialized (j=0) and then the processing proceeds to S1208.

In S1206, the area group segmenting unit 71 adds 1 to the value Ng if j=Ng holds true, and the processing proceeds to S1207. The area group segmenting unit 71 adds 1 to the value j if j=Ng does not hold true, and the processing proceeds to S1202.

In S1207, the area group segmenting unit 71 newly sets an Ng-th area group and allocates the i-th piece of the area pair information thereto.

In S1208, the area group segmenting unit 71 determines whether or not the pieces of the area pair information equal to a prescribed threshold Tg have been allocated to all the area groups. The processing proceeds to S1209 if the Tg pieces of the area pair information have not been allocated to all the area groups yet. Otherwise, the area group segmenting unit 71 carries out processing associated with termination.

In S1209, the area group segmenting unit 71 allocates dummy area information to each area group that includes the pieces of the area pair information below the threshold Tg. Here, as an example of the dummy area information, two pieces of the area information satisfying the degree of identicalness S=1 based on the result of determination of the degree of identicalness in FIG. 11 are selected and set to an RGB area average value $RGB^{ave}1$ of the image 1 and an RGB area average value $RGB^{ave}2$ of the image 2. As in the example described herein regarding the case of adding the dummy area information, it is possible to generate the color conversion parameters in this embodiment as long as there is at least one piece of the area pair information.

The description will continue while going back to FIG. 8.

In S802, the color conversion parameter generating unit 72 generates the color conversion parameters from color values in the reference area of the image 1 to color values in the reference area of the image 2, which are included in each area group. Here, a case of generating a conversion matrix as an example of the color conversion parameters will be described. Note that the RGB area average values of the reference areas in the images 1 included in three pieces of the area information in each area group will be defined as $RGB^{ave}1\_1$, $RGB^{ave}1\_2$, and $RGB^{ave}1\_3$. Meanwhile, the RGB area average values of the reference areas in the images 2 included in the three pieces of the area information in each area group will be defined as $RGB^{ave}2\_1$, $RGB^{ave}2\_2$, and $RGB^{ave}2\_3$. In the meantime, the conversion matrix between the RGB area average values of the reference areas in the images 1 and the RGB area average values of the reference areas in the images 2 in each area group will be defined as M (m11 to m33). In this instance, the RGB area average values of the respective images and the conversion matrix M are defined as formula 1. Here, the conversion matrix M (m11 to m33) is obtained as a solution to a system of equations.

$$\begin{bmatrix} R^{ave}1\_1 & G^{ave}1\_1 & B^{ave}1\_1 \\ R^{ave}1\_2 & G^{ave}1\_2 & B^{ave}1\_2 \\ R^{ave}1\_3 & G^{ave}1\_3 & B^{ave}1\_3 \end{bmatrix} = \begin{bmatrix} m11 & m12 & m13 \\ m21 & m22 & m23 \\ m31 & m32 & m33 \end{bmatrix} \times $$

$$\begin{bmatrix} R^{ave}2\_1 & G^{ave}2\_2 & B^{ave}2\_3 \\ R^{ave}2\_1 & G^{ave}2\_2 & B^{ave}2\_3 \\ R^{ave}2\_1 & G^{ave}2\_2 & B^{ave}2\_3 \end{bmatrix}$$

Formula (1)

Here, the conversion matrix M becomes a unit matrix in the case where the image 1 and the image 2 are the same captured image.

Note that the color conversion parameters only need to be capable of mapping from the RGB area average values of the reference areas of the images 2 included in the three pieces of the area pair information of each area group to the RGB area average values of the reference areas of the images 1 therein. In this regard, the color conversion parameters may be defined by using correction coefficients such as gains and γ values for the respective channels as far as such coefficients can achieve bijective mapping instead of approximation.

In S803, a determination is made as to whether or not the color conversion parameters have been generated for all the area groups. The processing proceeds to S802 if the color conversion parameters have not been generated for all the area groups yet; otherwise, processing associated with termination is carried out.

<Operation of Color Difference Derivation Processing in S304>

Figure 13:
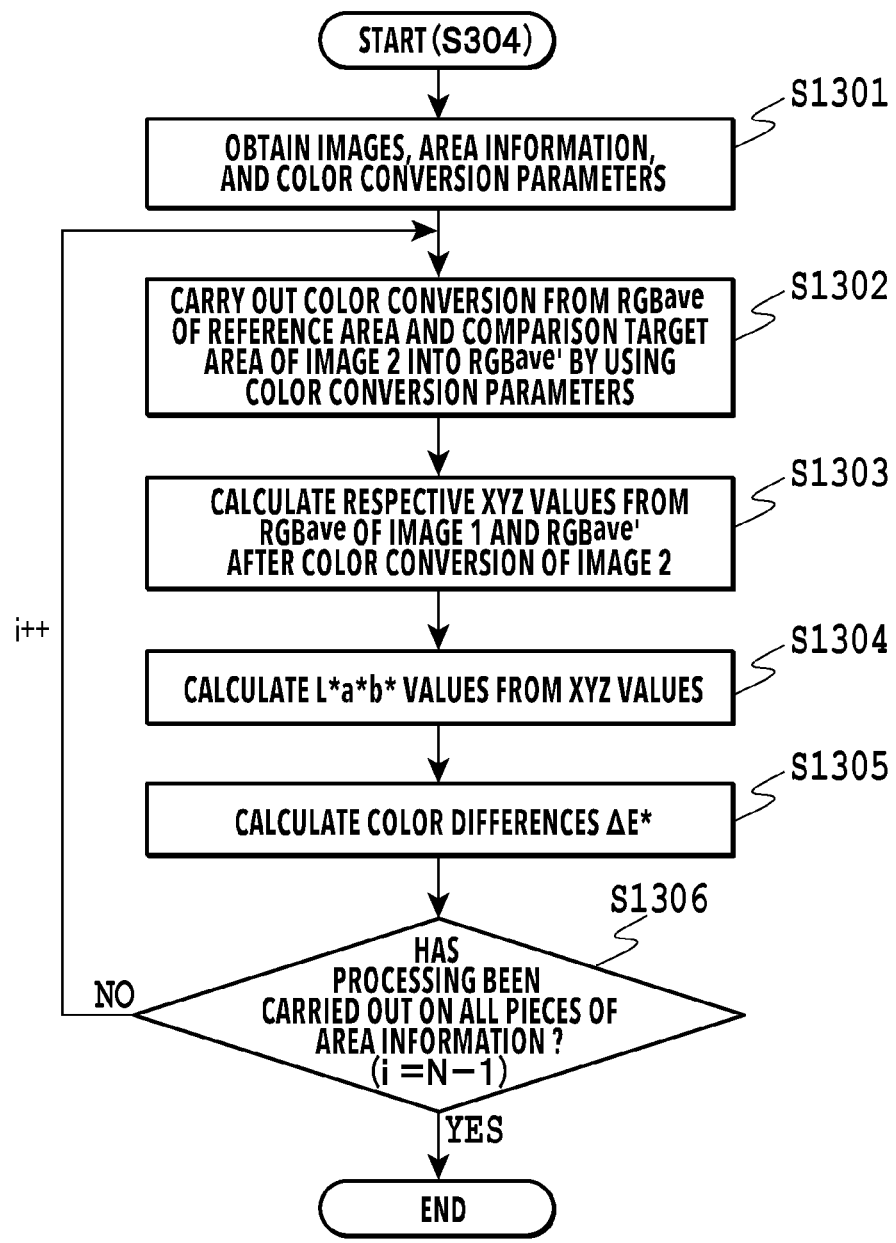
FIG. 13 is a flowchart showing color difference derivation processing.

FIG. 13 is a flowchart of color difference derivation processing to be executed in S304. Now, a description will be given below of details of an operation of color difference derivation processing with reference to FIG. 13.

In S1301, the color difference deriving unit 24 obtains the image 1 and the image 2, the area information on the reference areas and the comparison target areas set to the image 1 and the image 2, and the RGB area average values as well as the color conversion parameters of the reference areas set to the image 1 and the image 2 which are generated in S303. The area information on the comparison target areas set to the image 1 and the image 2 is obtained from user input in which the user designates the comparison target areas on the image display windows 401 and 404. The RGB area average values of the comparison target areas set to the image 1 and the image 2 are calculated by in accordance with formula (2) based on the image 1, the image 2 and on the area information on the comparison target area pairs as with the case of the RGB area average values of the reference areas.

In S1302, the color difference deriving unit 24 subjects the RGB area average value of the reference area and the RGB area average value of the comparison target area of the image 2 to color conversion by using the color conversion parameters corresponding to the piece of the area pair information including this reference area, thereby deriving the respective RGB area average values after the color conversion.

In 51303, the color difference deriving unit 24 carries out XYZ calculation regarding the RGB area average values of the reference area and the comparison target area of the image 1 as well as RGB' area average values of the reference area and the comparison target area after the color conversion of the image 2 by using a conversion matrix 0 in formula 4, respectively.

$$\begin{bmatrix} X \\ Y \\ Z \end{bmatrix} = O \begin{bmatrix} R \\ G \\ B \end{bmatrix}, O = \begin{bmatrix} o11 & o12 & o13 \\ o21 & o22 & o23 \\ o31 & o32 & o33 \end{bmatrix}$$

Formula (4)

In S1304, the color difference deriving unit 24 calculates L*a*b* values on a three-dimensional color space, which is defined by a brightness axis and a chromaticity plane, from the XYZ values of the pixels in accordance with formula 5.

$$L^* = 116 * f\left(\frac{Y}{Y_n}\right) - 16$$

$$a^* = 500 * \left(f\left(\frac{X}{X_n}\right) - f\left(\frac{Y}{Y_n}\right)\right)$$

$$b^* = 200 * \left(f\left(\frac{Y}{Y_n}\right) - f\left(\frac{Z}{Z_n}\right)\right)$$

if $\frac{X}{X_n} > 0.008856$, $f\left(\frac{X}{X_n}\right) = \left(\frac{X}{X_n}\right)^{\frac{1}{3}}$, otherwise $f\left(\frac{X}{X_n}\right) = 7.787 * \left(\frac{X}{X_n}\right) - 16/116$ if $\frac{Y}{Y_n} > 0.008856$, $f\left(\frac{Y}{Y_n}\right) = \left(\frac{Y}{Y_n}\right)^{\frac{1}{3}}$, otherwise $f\left(\frac{Y}{Y_n}\right) = 7.787 * \left(\frac{Y}{Y_n}\right) - 16/116$ if $\frac{Z}{Z_n} > 0.008856$, $f\left(\frac{Z}{Z_n}\right) = \left(\frac{Z}{Z_n}\right)^{\frac{1}{3}}$, otherwise $f\left(\frac{Z}{Z_n}\right) = 7.787 * \left(\frac{Z}{Z_n}\right) - 16/116$ Formula (5)

In S1305, the color difference deriving unit 24 calculates color differences ΔE* regarding the image 1 and the image 2 in accordance with formula 6, respectively. Here, a color difference between a value L*a*b*1 being the L*a*b* value of the reference area of the image 1 and a value L*a*b*2 being the L*a*b* value of the comparison target area thereof is defined as a color difference ΔE*1. Meanwhile, a color difference between a value L*a*b*3 being the L*a*b* value after the color conversion of the reference area of the image 2 and a value L*a*b*4 being the L*a*b* value of the comparison target area thereof is defined as a color difference ΔE*2. Note that these L*a*b* values are plotted in the color difference display graph 407 shown in FIG. 4.

$$\Delta E^*1 = \sqrt{(L^*1 - L^*2)^2 + (a^*1 - a^*2)^2 + (b^*1 - b^*2)^2}$$

$$\Delta E^*2 = \sqrt{(L^*3 - L^*4)^2 + (a^*3 - a^*4)^2 + (b^*3 - b^*4)^2}$$

Formula (6)

Although the color difference according to CIE 1976 is used as an example of the color difference in this embodiment, it is needless to say that other color difference evaluation indices are also applicable. For example, it is needless to say that a difference between the value ΔE*1 and the value ΔE*2 can be used as a color difference evaluation value.

In S1306, the color difference deriving unit 24 determines whether or not the color difference derivation processing has been carried out on all the pieces of the area pair information in the area information list (i=N−1). The processing returns to S1302 if the color difference derivation processing has been carried out on all the pieces of the area pair information; otherwise, the color difference deriving unit 24 terminates the color difference derivation processing.

As described above, in this embodiment, the two images obtained by capturing the images under the image capturing environments with different illumination conditions and the color information on the respective reference areas in these captured images are used to generate the color conversion parameters for carrying out the color conversion from the color values of the reference area of one of the images to the color values of the reference area of the other image. Moreover, the color values of the reference area and the comparison target area of the one image are subjected to the color conversion by using the color conversion parameters. This makes it possible to appropriately compare the color difference between the reference area and the comparison target area in the one image with the color difference between the reference area and the comparison target area in the other image.

Second Embodiment

The first embodiment has described the method of carrying out the color conversion by using the area information and thus evaluating the color difference. Here, the pieces of the area information adopt a method of equalizing the RGB values among the images even in the case of different degrees of brightness. However, if the illumination conditions are significantly different, there may be a case of deriving a combination of RGB values that are significantly different from one another. In that case, conversion errors may grow large if there are large differences between the original color values and the color values after the color conversion. Given the situation, this embodiment will describe a method of using the chromaticity as the evaluation value for calculating the color difference while eliminating the brightness in the case where the brightness is significantly different between before and after the color conversion. Note that this embodiment will discuss only features that are different from those of the first embodiment.

<Operation of Color Difference Derivation Processing in S304>

Figure 14:
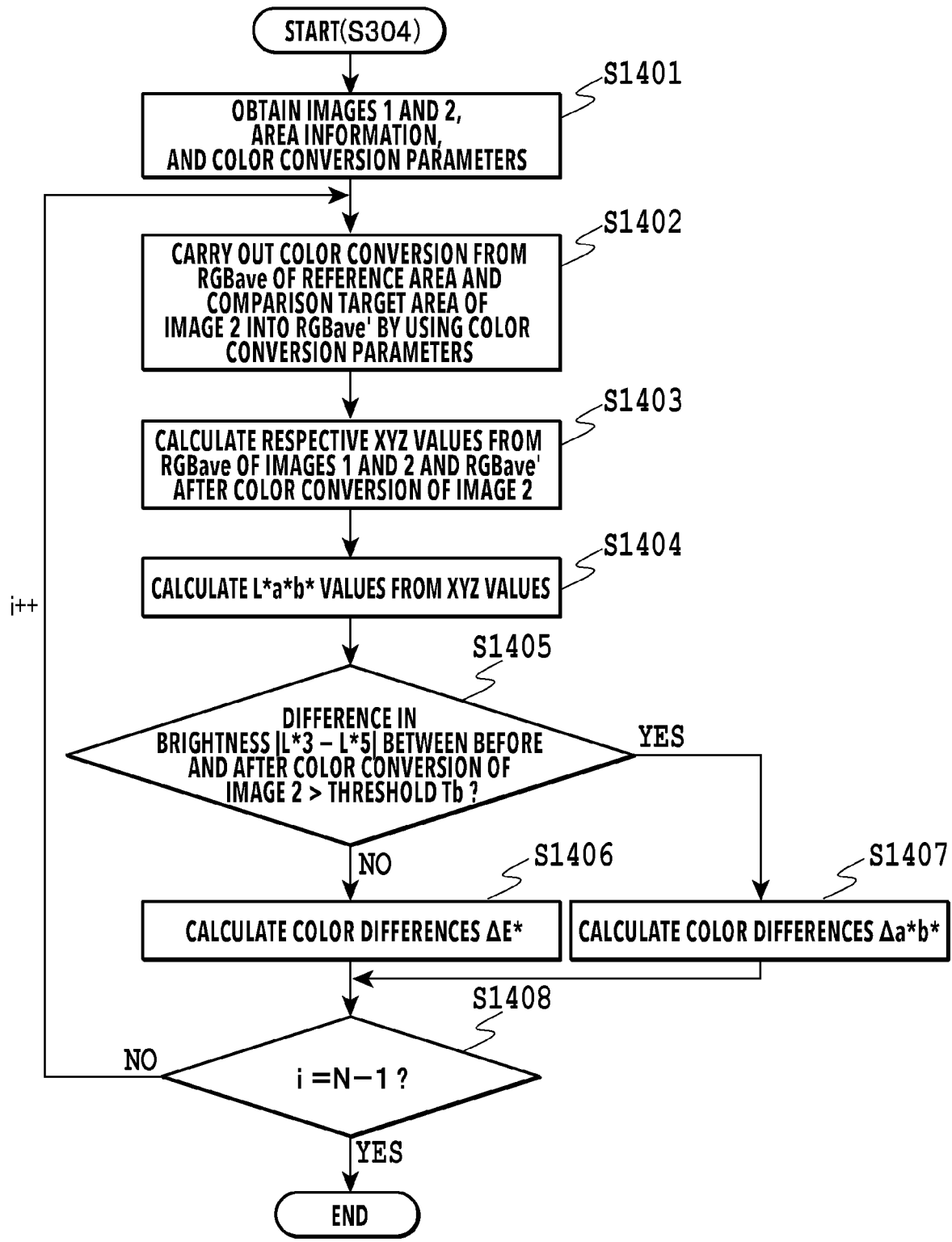
FIG. 14 is a flowchart showing other color difference derivation processing.

FIG. 14 is a flowchart of the processing to be carried out in S304. Now, a description will be given below of details of an operation of the color difference derivation processing with reference to FIG. 14.

In S1401, the color difference deriving unit 24 obtains the image 1 and the image 2, the area information on the reference areas and the comparison target areas set to the image 1 and the image 2, and the RGB area average values as well as the color conversion parameters of the reference areas set to the image 1 and the image 2 which are generated in S303. The area information on the comparison target areas set to the image 1 and the image 2 is obtained from user input in which the user designates the comparison target areas on the image display windows 401 and 404. The RGB area average values of the comparison target areas set to the image 1 and the image 2 are calculated by using formula 2 based on the image 1, the image 2, and the area information on the comparison target area pairs as with the case of the RGB area average values of the reference areas.

In S1402, the color difference deriving unit 24 subjects the RGB area average value of the reference area and the RGB area average value of the comparison target area of the image 2 to color conversion by using the color conversion parameters corresponding to the piece of the area pair information including this reference area, thereby deriving the respective RGB area average values after the color conversion.

In S1403, the color difference deriving unit 24 carries out XYZ calculation regarding the RGB area average values of the reference areas and the comparison target areas of the images 1 and 2 as well as the RGB' area average values of the reference area and the comparison target area after the color conversion of the image 2 in accordance with formula 4.

In S1404, the color difference deriving unit 24 calculates the L*a*b* values on the three-dimensional color space, which is defined by the brightness axis and the chromaticity plane, from the XYZ values of the pixels in accordance with formula 5.

In S1405, the color difference deriving unit 24 determines whether or not the difference in brightness value L* calculated from the RGB area average values before and after the color conversion of the image 2 in accordance with formula 7 is greater than a threshold Tb. The processing proceeds to S1406 if the difference is equal to or below the threshold Tb, or otherwise, proceeds to S1407. Here, the value L*a*b*1 is the L*a*b* value of the reference area of the image 1 and the value L*a*b*2 is the L*a*b* value of the comparison target area thereof. Meanwhile, the value L*a*b*3 is the L*a*b* value of the reference area after the color conversion of the image 2 and the value L*a*b*4 is the L*a*b* value of the comparison target area after the color conversion thereof. In the meantime, a value L*a*b*5 is the L*a*b* value of the reference area before the color conversion of the image 2 and a value L*a*b*6 is the L*a*b* value of the comparison target area before the color conversion thereof.

$$|L*3 - L*5| > Tb \qquad \text{Formula (7)}$$

In S1406, the color difference deriving unit 24 calculates the color differences ΔE* in accordance with formula 6.

In S1407, the color difference deriving unit 24 calculates color differences Δa*b* on the chromaticity plane in accordance with formula 8.

$$\left.\begin{array}{l} \Delta a^*b^*1 = \sqrt{(a^*1 - a^*2)^2 | (b^*1 - b^*2)^2} \\ \Delta a^*b^*2 = \sqrt{(a^*3 - a^*4)^2 | (b^*3 - b^*4)^2} \end{array}\right\} \qquad \text{Formula (8)}$$

In S1408, the color difference deriving unit 24 determines whether or not the color difference derivation processing has been carried out on all the pieces of the area pair information in the area information list (i=N−1). The processing returns to S1402 if the color difference derivation processing has been carried out on all the pieces of the area pair information; otherwise, the color difference deriving unit 24 terminates the color difference derivation processing.

As described above, in this embodiment, the color conversion parameters are generated from the two images obtained by capturing the images under the image capturing environments with different illumination conditions and from the color information on the respective reference areas in these captured images as with the first embodiment. Moreover, these color conversion parameters are used to carry out the color conversion of the color values of the reference area and the comparison target area of one of the images. Here, in the case where there is a significant difference between the brightness values L* before and after the color conversion due to the significant difference in brightness between the images captured under the difference image capturing environments, each color difference is calculated in terms of the chromaticity plane while eliminating the influence of the brightness. These procedures make it possible to appropriately compare the color difference between the reference area and the comparison target area in the one image with the color difference between the reference area and the comparison target area in the other image.

OTHER EMBODIMENTS

In the above-described embodiments, the L*a*b* values are used as the color information in the case of deriving the averages of the rectangles of the selected areas. Instead, the averages may be derived from the XYZ values or the RGB values and then converted into the L*a*b* values.

Meanwhile, the first and second embodiments have explained the example of using the multiple pieces of the area information. However, it is needless to say that the first and second embodiments can be realized as long as there is at least one piece of the area information.

The first embodiment has described the example of displaying the color information plotted in the color space based on the calculated L*a*b* values as the color difference display graph 407 shown in FIG. 4. Of course, it is needless to say that numerical value information on the color differences or numerical value information on differences of the color differences between the images may be displayed together with the graph, or only the pieces of the numerical value information may be displayed instead.

In the above-described embodiments, the color conversion is carried out on color difference evaluation areas in the process of color difference derivation. Instead, the color conversion may be carried out on the entire images and the images may also be outputted together. Alternatively, in the case where multiple pieces of color conversion data are generated, multiple images may be generated and a display unit may convert the generated images into images corresponding to the area groups in which the color difference evaluation areas to be designated are classified and may display the converted images.

According to the technique of this disclosure, it is possible to appropriately carry out comparison of a desired color in images obtained by capturing an inspection target object under image capturing environments with different illumination conditions.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Regarding the color conversion generating unit 23, the color difference deriving unit 24, and the like out of the respective processing units described above, the processing may be carried out by using a trained model subjected to machine learning instead thereof. In this case, combinations of input data to the processing unit and output data from the processing unit are prepared as sets of learning data. Then, a trained model is generated which has obtained knowledge from the learning data through machine learning and is configured to output output data corresponding to input data as a result based on the obtained knowledge. The trained model can be formed from a neural network model, for example. Moreover, the trained model carries out the processing of the processing unit by being operated as a program for carrying out the processing equivalent to the processing unit in conjunction with any of a CPU, a GPU, and the like. Here, the trained model may be updated after carrying out a predetermined quantity of the processing as appropriate.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-101701 filed Jun. 11, 2020, which is hereby incorporated by reference wherein in its entirety.

What is claimed is:

1. An apparatus comprising:
one or more processors;
at least one memory coupled to the one or more processors storing instructions that, when executed by the one or more processors, cause the one or more processors to function as:
a first obtaining unit configured to obtain a first image and a second image by capturing images of a target object under different capturing conditions;
a second obtaining unit configured to obtain area information for each of the first image and the second image, the area information being set in an area corresponding to the object and specifying a reference area serving as a reference for comparison and a comparison target area serving as a target for the comparison;
a generating unit configured to generate a color conversion parameter for carrying out a color conversion such that a color value of the reference area in the second image coincides with a color value of the reference area in the first image; and a first deriving unit configured to carry out, based on the color conversion parameter, the color conversion of the color value of the reference area and a color value of the comparison target area in the second image and derive a color difference between the reference area and the comparison target area in the second image after the color conversion.

2. The apparatus according to claim 1, wherein the first deriving unit derives a color difference between the reference area and the comparison target area in the first image.

3. The apparatus according to claim 1, wherein the reference area in the second image paired with the first image is set to the reference area in the first image, the comparison target area in the second image paired with the first image is set to the comparison target area in the first image, the paired reference areas in the first image and the second image include areas that capture an identical region of the object, and the paired comparison target areas in the first image and the second image include areas that capture an identical region of the object.

4. The apparatus according to claim 1, wherein the second obtaining unit obtains a plurality of pieces of area pair information each including the area information to specify the paired reference areas in the first image and the second image.

5. The apparatus according to claim 4, wherein the generating unit includes a segmenting unit configured to segment the plurality of pieces of area pair information in the first image and the second image into area groups each including a predetermined number of pieces of the area pair information, and the segmenting unit segments the plurality of pieces of area pair information regarding the reference areas in the first image and the second image to be specified in the predetermined number of pieces of area pair information included in each of the area groups such that mapping that uses the color conversion parameter from the color value of the reference area in the second image into the color value of the reference area in the first image becomes bijective mapping.

6. The apparatus according to claim 5, wherein the segmenting unit includes a second deriving unit configured to derive a degree of identicalness of the reference areas to the first images and a degree of identicalness of the reference areas to the second images among the plurality of pieces of area pair information, and the segmenting unit segments the reference areas forming a plurality of pairs among the predetermined number of pieces of area pair information included in a same area group such that each of the degree of identicalness of the reference areas in the first images and the degree of identicalness of the reference areas in the second images becomes equal to or below a prescribed threshold.

7. The apparatus according to claim 6, wherein each degree of identicalness is a value based on a distance in a three-dimensional color space of colors in two reference areas subject to measurement of the degree of identicalness out of the plurality of reference areas to the first images and to the second images.

8. The apparatus according to claim 1, wherein the color difference is a distance on a three-dimensional color space.

9. The apparatus according to claim 8, wherein the three-dimensional color space is a three-dimensional color space defined by a brightness axis and a chromaticity plane, and the color difference is a distance on the chromaticity plane.

10. The apparatus according to claim 1, wherein the one or more processors further function as:

a control unit configured to cause a display device to display the color difference.

11. The apparatus according to claim 10, wherein the control unit causes the display device to display a difference of a color difference between the reference area and the comparison target area in the first image from a color difference between the reference area and the comparison target area in the second image.

12. The apparatus according to claim 10, wherein the control unit causes the display device to display the color values of the reference area and the comparison target area in the first image as well as the reference area and the comparison target area in the second image in a comparable fashion.

13. The apparatus according to claim 10, wherein the control unit causes the display device to display a graph of the color values of the reference area and the comparison target area in the first image as well as the reference area and the comparison target area in the second image.

14. The apparatus according to claim 10, wherein the control unit causes the display device to display a user interface for accepting input of the area information by a user.

15. The apparatus according to claim 1, wherein each of the color value of the reference area and a color value of the comparison target area in the first image as well as each of the color value of the reference area and a color value of the comparison target area in the second image is an average value of color values in each of the areas.

16. A non-transitory computer readable storage medium storing a program to cause a computer to execute a method comprising:

obtaining a first image and a second image obtained by capturing images of a target object under different capturing conditions;

obtaining area information for each of the first image and the second image, the area information being set in an area corresponding to the object and specifying a reference area serving as a reference for comparison and a comparison target area serving as a target for the comparison;

generating a color conversion parameter for carrying out a color conversion such that a color value of the reference area in the second image coincides with a color value of the reference area in the first image; and carrying out, based on the color conversion parameter, the color conversion of the color value of the reference area and a color value of the comparison target area in the second image and deriving a color difference between the reference area and the comparison target area in the second image after the color conversion.

17. A method comprising:

obtaining a first image and a second image obtained by capturing images of a target object under different capturing conditions;

obtaining area information for each of the first image and the second image, the area information being set in an area corresponding to the object and specifying a reference area serving as a reference for comparison and a comparison target area serving as a target for the comparison;

generating a color conversion parameter for carrying out a color conversion such that a color value of the reference area in the second image coincides with a color value of the reference area in the first image; and carrying out, based on the color conversion parameter, the color conversion of the color value of the reference area and a color value of the comparison target area in the second image and deriving a color difference between the reference area and the comparison target area in the second image after the color conversion.

* * * * *